(12) United States Patent
Woods (10) Patent No.: US 10,798,922 B1
(45) Date of Patent: Oct. 13, 2020

(54) BEE INSTALLATION FUNNEL AND ASSOCIATED ASSEMBLY AND METHOD FOR USING THE SAME

(71) Applicant: Jill Adele Woods, Fennville, MI (US)

(72) Inventor: Jill Adele Woods, Fennville, MI (US)

( * ) Notice: Subject to any disclaimer, the term of this patent is extended or adjusted under 35 U.S.C. 154(b) by 181 days.

(21) Appl. No.: 15/051,025

(22) Filed: Feb. 23, 2016

Related U.S. Application Data (60) Provisional application No. 62/119,727, filed on Feb. 23, 2015.

(51) Int. Cl.
*A01K 47/06* (2006.01)

(52) U.S. Cl.
CPC .................... *A01K 47/06* (2013.01)

(58) Field of Classification Search
CPC ........ A01K 47/06; A01K 49/00; A01K 57/00;
A01K 47/00; B65B 39/00; B65B 39/007;
B65B 39/02; B67C 11/00; B67C 11/02;
B31B 1/16; B31B 1/20; B31B 19/20;
B31B 2201/26; B31B 2203/00; B31B
2203/062; B31B 2203/066; B31B
2203/068; B31F 1/0003; B31F 1/0006;
B31F 1/0009; B31F 1/0012; A61F 5/455;
A61F 5/4556; A47F 13/08; A01B 1/02;
A01B 1/022; A01B 1/024; A01B 1/026;
A01B 1/028; E01H 1/12; E01H 1/1206;
E01H 2001/122; E01H 2001/1226; E01H
2001/1293; B65D 5/16; B65D 5/746;
B65D 5/72; B65D 5/724; B65D 5/74;
B65D 1/225; B65D 1/22; A41D 13/11;
A41D 13/1107; A41D 13/1161
See application file for complete search history.

(56) References Cited

U.S. PATENT DOCUMENTS

| | | | | | |
|---|---|---|---|---|---|
| 85,885 | A | * | 1/1869 | Wright | A01K 47/00 449/27 |
| 1,160,748 | A | * | 11/1915 | Natale | A01B 1/02 294/176 |
| 1,287,181 | A | * | 12/1918 | Barker | B05B 12/28 118/504 |
| 1,376,012 | A | * | 4/1921 | Freeman | A47L 13/52 15/257.5 |
| 1,500,125 | A | * | 7/1924 | Hall | B31B 50/00 493/160 |
| 1,580,441 | A | * | 4/1926 | Parks | B31B 70/00 493/241 |
| 2,135,409 | A | * | 11/1938 | Munn | B31B 50/00 493/167 |
| 3,469,762 | A | * | 9/1969 | La Torre | B65D 5/20 15/257.6 |

(Continued)

FOREIGN PATENT DOCUMENTS

DE            3542098      * 6/1987     .......... E01H 1/1206

*Primary Examiner* — Kathleen I Alker
(74) *Attorney, Agent, or Firm* — King & Partners, PLC (57) ABSTRACT

A bee installation funnel apparatus, including: (1) a unitary blank having (a) a back panel, wherein the back panel includes a top side, a left side, a right side, and a bottom side, and at least one aperture, (b) at least one side panel, wherein the at least one side panel emanates contiguously from the back panel; and (c) a bottom panel, wherein the bottom panel comprises a top side, a left side, a right side, and a bottom side, and at least one tab, and (2) a security strap member, wherein the security strap member is positionable around an associated bee hive.

1 Claim, 5 Drawing Sheets

(56) References Cited

U.S. PATENT DOCUMENTS

| | | | |
|---|---|---|---|
| 3,534,424 A * | 10/1970 | Levinson | A47L 13/52 15/105 |
| 3,587,699 A * | 6/1971 | Kovach | A45C 3/00 206/316.2 |
| D233,158 S * | 10/1974 | Lowe | 119/161 |
| 4,077,075 A | 3/1978 | Schade | |
| 4,135,265 A | 1/1979 | Van de Kerkof | |
| 4,186,955 A * | 2/1980 | Campbell | E01H 1/1206 15/104.8 |
| 4,199,832 A | 4/1980 | Glasscock et al. | |
| 4,251,097 A * | 2/1981 | Whitten, II | E01H 1/1206 294/1.3 |
| 4,322,861 A | 4/1982 | Healy | |
| 4,367,563 A | 1/1983 | Ferguson et al. | |
| 4,443,904 A | 4/1984 | Van Muyden | |
| 4,524,476 A | 6/1985 | Adams, IV | |
| 4,635,843 A * | 1/1987 | Tomlinson | A47G 21/001 229/117.18 |
| 4,830,419 A * | 5/1989 | Watanabe | E01H 1/1206 15/104.8 |
| 5,135,429 A * | 8/1992 | Gefen | A01K 49/00 449/2 |
| 5,211,597 A | 5/1993 | Scott et al. | |
| 5,509,846 A | 4/1996 | Kueneman et al. | |
| 5,584,519 A * | 12/1996 | Myles | E01H 1/1206 294/1.3 |
| 5,620,010 A * | 4/1997 | Vancaillie | A61B 1/12 128/845 |
| 6,202,225 B1 * | 3/2001 | Beck | A61F 5/4556 141/337 |
| 6,209,780 B1 * | 4/2001 | Jensen | B65D 5/4229 206/459.5 |
| 6,250,695 B1 * | 6/2001 | Berkman | E01H 1/1206 294/1.3 |
| 7,240,701 B2 * | 7/2007 | Salani | B65D 25/48 141/337 |
| 7,472,668 B2 * | 1/2009 | Lau | E01H 1/1206 119/867 |
| 8,348,817 B2 * | 1/2013 | Bruns | B31B 50/00 493/11 |
| 8,757,563 B2 * | 6/2014 | Muse | B65B 39/007 248/97 |
| 8,801,493 B2 | 8/2014 | Vincent | |
| 8,814,630 B2 | 8/2014 | Rittberger | |
| 9,879,429 B2 * | 1/2018 | Joly, Jr. | E04D 13/0643 |
| 2004/0222650 A1 * | 11/2004 | Colesanti | E01H 1/1206 294/1.3 |
| 2006/0144467 A1 * | 7/2006 | Butzer | B65B 67/04 141/391 |
| 2008/0314896 A1 * | 12/2008 | Shellhorn | B65D 5/18 220/6 |
| 2011/0042258 A1 * | 2/2011 | Nett | A61F 5/4556 206/494 |
| 2013/0174911 A1 * | 7/2013 | Bacich | B67C 11/02 137/1 |
| 2014/0291386 A1 * | 10/2014 | Ikeda | B65D 71/18 229/162.1 |
| 2015/0021226 A1 * | 1/2015 | Jacomelli | B65D 5/001 206/508 |
| 2015/0166249 A1 * | 6/2015 | McDonald | B65D 83/0858 206/758 |
| 2016/0107799 A1 * | 4/2016 | Streich | B31B 1/82 220/663 |
| 2016/0280407 A1 * | 9/2016 | Lindt | B65D 5/724 |

* cited by examiner

BEE INSTALLATION FUNNEL AND ASSOCIATED ASSEMBLY AND METHOD FOR USING THE SAME

CROSS-REFERENCE TO RELATED APPLICATIONS

This application claims the benefit of U.S. Provisional Application Ser. No. 62/119,727, filed Feb. 23, 2015, entitled "B-Funnel Front Load Bee Installation Funnel," which is hereby incorporated herein by reference in its entirety—including all references and appendices cited therein.

BACKGROUND OF THE INVENTION

1. Field of the Invention

The present invention relates in general to bee installation funnels and associated assemblies, and, more particularly, to bee installation funnels that facilitate safe and efficient transfer of bees from a bee cage to a bee hive, such as, but not limited to, a Langstroth type hive. The present invention further relates to methods for installing bees from a bee cage to a bee hive utilizing a funnel as disclosed herein.

2. Background Art

Bee cages, hives, and their accessories have been known in the art for years and are the subject of a plurality of patents/publications, including: U.S. Pat. No. 8,814,630 entitled "PVC Beehive," U.S. Pat. No. 8,801,493 entitled "Beehive," U.S. Pat. No. 5,509,846 entitled "Disposable Biodegradable Bee Hive," U.S. Pat. No. 5,211,597 entitled "Portable Beehive," U.S. Pat. No. 4,524,476 entitled "Bee Shipping Box and Hive," U.S. Pat. No. 4,443,904 entitled "Bee Hive," U.S. Pat. No. 4,367,563 entitled "Combination Bee Pollen Trap and Hive Containment Apparatus," U.S. Pat. No. 4,322,861 entitled "Entrance for a Beehive," U.S. Pat. No. 4,199,832 entitled "Molded Polyurethane Beehives," U.S. Pat. No. 4,135,265 entitled "Bee Hive," and U.S. Pat. No. 4,077,075 entitled "Honeycomb Frame for Bee-Hive,"—all of which are hereby incorporated herein by reference in their entirety including the references cited therein.

U.S. Pat. No. 8,814,630 appears to disclose a beehive constructed and arranged to contain one or more components which are assembled using minimal amounts of fastening devices. The beehive includes one or more hive bodies, such as deep hive bodies or honey super bodies preferably made of rot proof PVC board, which are designed to house or store a bee colony, bee brood, and honey. Each of the bodies is designed to contain one or more walls which are secured together to form the body structure. The bodies are constructed of a single unit structure having one or more integral hinged members that join two rigid members together, allowing the two rigid members to fold along the line of the hinge. By folding along the line of the hinge, a desired shape can be constructed and secured without the need for additional fastening devices, such as screws or nails.

U.S. Pat. No. 8,801,493 appears to disclose a beehive that includes a column of stacked boxes which open onto each other at their tops and bottoms, with the column bearing a cap at its top and a floor at its bottom. The boxes have access ports for ingress and egress of bees, and the column is suspended above the ground on a support post which bears a pivot such that the column can be tipped from a vertical orientation to a horizontal orientation for easy maintenance. Bars, frames, and/or screens may be hung within and atop the boxes to promote desired comb-building behaviors, with bees tending to build comb downwardly from higher boxes into lower boxes. At desired times, upper boxes bearing honey may be removed from the column and lower boxes bearing brood may be rotated to the top of the column so that the bees continuously propagate down the column.

U.S. Pat. No. 5,509,846 appears to disclose a disposable, biodegradable beehive which comprises an enclosure of wax-coated cardboard. The enclosure includes an opening to allow the bees to enter or exit the beehive and a closure for the opening. Small ventilation holes, relative to the size of a bee, are provided to allow air to circulate. A plurality of cardboard layers are fitted to the bottom of the enclosure with a section of the layers removed to form a nest pocket or a dry feed pocket. A float feeder is attached to the enclosure with the feeder element internal to the enclosure, while the main body of the feeder is external to the enclosure to allow the feeder to be supplied with external liquid feed.

U.S. Pat. No. 5,211,597 appears to disclose a portable beehive for use in transporting a population of bees between a beekeeper facility and an orchard or the like. The portable beehive includes a box formed from a folded, single-piece blank, and a removable top cover. The interior of the box has inner end walls which form ledges for suspending honeycomb frames within the box. An exit opening is formed through an end wall of the box, and the exit is closed or opened by a door flap. The door flap, when opened, functions as a mat upon which may be placed concentrated pollen for transfer to the bees. Pivotable carrying handles perform multiple functions including holding the top cover in place, limiting the movement of the honeycomb frames within the box, and holding a bee food container in place atop the cover. A space is formed between the rear inner end wall and the rear outer end wall in which bee food may be placed; openings are provided in the rear inner end wall through which bees may access the food.

U.S. Pat. No. 4,524,476 appears to disclose a combination bee shipping box and beehive utilizes a commercial cardboard box having closure flaps as a body portion. A cardboard insert removably held in the box strengthens the box and provides a support for a plurality of standard frames or top bar frames. A flexible handle connected with the insert enables lifting the insert and supported frames from the box as a unit. When the box closure flaps are elevated and taped together, an additional tier of frames can be supported above the frames resting on the basic insert. Two boxes can be telescoped in assembled relationship to receive and support additional tiers of frames therein. A stable removable feeder assembly is provided in the space above the frames and below the box closure flaps to nourish bees during shipment. A ventilating screen closure panel for the box while being used as a hive is provided.

U.S. Pat. No. 4,443,904 appears to disclose a bee hive assembly comprising one or more hive elements supported as a stack on a base element and covered by a roof element. Each hive element comprises a frame having at each of two opposite sides a window-like frame opening covered by a transparent panel. A liquid storage tank is fittingly mounted in the frame opening inwardly of and spaced from the transparent panel. The storage tank has transparent walls, a removable cover closing its upper side, and a drinking trough formed at the bottom end of the rear wall of the tank and having a width smaller than the width of the body of a worker-bee. The tank is provided with a liquid level control for maintaining the liquid in the drinking trough at a constant level which is accessible to the bees from the interior of the hive.

U.S. Pat. No. 4,367,563 appears to disclose a combination pollen trap and containment apparatus for attachment to a bee hive having a frame attachable at the opening of the hive. The frame defines a pathway through which the bees must pass to gain entrance to the hive. A pollen collection screen is detachably securable in the pathway and bees entering and leaving the hive are forced to pass through the screen causing pollen pellets to be loosened from the body and legs of the bee. The screen can be easily removed when it is desired to open the hive. A pollen drawer is located below the pollen screen and serves to collect the pollen falls from the bees. A containment screen is also securable in the pathway to retain the bees within the hive. The containment screen has openings to provide for ventilation and permit the beekeeper to feed the bees during periods of confinement.

U.S. Pat. No. 4,322,861 appears to disclose a pollen collecting entrance structure for a beehive comprising a base for supporting a beehive, said base defining an accessway providing communication with the exterior of the base and the space, said space being in open communication with the beehive, a grid removably mounted across the path through the space between the accessway and the beehive, a removable receptacle located below the grid to collect the pollen dislodged from the bees bodies when passing through the grid, said grid and receptacle being removable from the base without the need to disturb the beehive.

U.S. Pat. No. 4,199,832 appears to disclose a preparation of beehives from a synthetic resinous material which is acceptable to the bees, which is not attacked by vermin, and which exhibits the requisite physical properties to provide a desirable beehive is accomplished by assembling the hives from molded urethane foam panels, the urethane foam being formulated so as to produce a product which is not rejected by the bees and which does not make the bees nervous or otherwise interfere with their normal habits in secreting honey in said beehive.

U.S. Pat. No. 4,135,265 appears to disclose a bee hive having a bottom section including inclined boards extending upwardly from the front and rear walls to meet at about the center of the top of the side walls to define a first space beneath the boards and a second space above the boards. Internal vents in the side walls to permit air flow between the first space and the second space. At least one closeable vent in each side wall communicates the first space with the exterior of the bottom sections. At least one closeable vent in the rear wall communicates the second space with the exterior of the bottom section. A hive section having double walls is provided and the hive has a top section comprising (i) an inner cover that can be adapted to function as a feed and provides insulation; (ii) a reversible inner lid; and (iii) an outer lid. The hive permits wintering of bees in cold climates.

U.S. Pat. No. 4,077,075 appears to disclose a honeycomb frame for a beehive that is comprised solely of frame-forming elements of C-profile whose channels are inwardly directed. The abutting ends of these elements are connected by coupling members slidable into the C-profiles and in frictional engagement with the abutting ends. A queen cell cup, prewired foundations and the like are attached to the frame by fastening elements slidably mounted in the C-profile of the frame elements.

While the above-identified patents/publications do appear to disclose various bee hives, cages, and associated accessories, their configurations remain non-desirous and/or problematic inasmuch as, among other things, none of the above-patents appear to be disclose bee installation funnels that facilitate safe and efficient transfer of bees from a bee cage to a bee hive as disclosed herein.

It is therefore an object of the present invention to provide a bee installation funnel and associated assembly that facilitates the transfer of bees from a bee cage to a bee hive in a safe and efficient manner.

These and other objects of the present invention will become apparent in light of the present specification, claims, and drawings.

SUMMARY OF THE INVENTION

The present invention is directed to, in one embodiment, a bee installation funnel apparatus, for transferring bees from a bee cage to a bee hive, said bee installation funnel apparatus being articulable from a substantially flat, collapsed configuration of foldable material to a substantially rigid, upright three-dimensional articulated configuration with minimal fabrication effort, while enabling storage and shipment of said bee installation funnel apparatus in a minimum profile orientation while in said collapsed configuration, and further while enabling safe and efficient transfer of bees from a bee cage to a bee hive while in said articulated configuration, said bee installation funnel apparatus, comprising, consisting essentially of and/or consisting of: (a) a unitary blank comprising: (1) a back panel, wherein the back panel comprises a top side, a left side, a right side, and a bottom side, and at least one aperture; (2) at least one side panel, wherein the at least one side panel emanates contiguously from the back panel; and (3) a bottom panel, wherein the bottom panel comprises a top side, a left side, a right side, and a bottom side, and at least one tab; and (b) a security strap member, wherein the security strap member is positionable around an associated bee hive.

In a preferred embodiment of the present invention, the back panel is generally rectangular.

In another preferred embodiment of the present invention, the back panel comprises two apertures for associating the security strap member therethrough.

In yet another preferred embodiment of the present invention, the at least one side panel comprises a left side panel, wherein the left side panel is generally trapezoidal and emanates contiguously from the left side of the back panel, and a right side panel, wherein the right side panel is generally trapezoidal and emanates contiguously from the right side of the back panel.

In another aspect of the present invention, the bottom panel is generally rectangular and comprises a left tab, wherein the left tab emanates contiguously from the left side of the bottom panel, and a right tab, wherein the right tab emanates contiguously from the right side of the bottom panel.

In a preferred embodiment of the present invention, a score line is positioned between the left side of the back panel and the left side panel, a score line is positioned between the right side of the back panel and the right side panel, and a score line is positioned between the bottom side of the back panel and the top side of the bottom panel.

In another preferred embodiment of the present invention, a score line is positioned between the left side of the bottom panel and the left tab, and a score line is positioned between the right side of the bottom panel and the right tab.

In yet another preferred embodiment of the present invention, a hinge is positioned between the left side of the bottom panel and the left tab, and a hinge is positioned between the right side of the bottom panel and the right tab.

In one embodiment of the present invention, the security strap member preferably comprises a hook and loop fastener, such as a Velcro® fastener.

In a preferred embodiment of the present invention, the unitary blank is fabricated from corrugated plastic and/or corrugated paperboard.

The present invention is also directed to a bee installation assembly, comprising, consisting essentially of and/or consisting of: (a) a bee installation funnel apparatus; (b) a bee cage having a left wall, a right wall, a bottom wall, a top wall, a front wall, and a back wall, said walls being spaced apart from one another to form a chamber for containing bees therein, and further wherein the bottom wall includes an aperture; (c) a bee hive having a left wall, a right wall, a bottom wall, a top wall, a front wall, and a back wall, said walls being spaced apart from one another to form a chamber for containing bees therein, and further wherein the front wall includes an aperture; (d) wherein tabs of the bee installation funnel apparatus are inserted into the aperture of the bee hive; (e) wherein the bee cage is positioned on top of the bee installation funnel apparatus; and (f) wherein the bee installation funnel apparatus is secured to the bee hive via a security strap member.

BRIEF DESCRIPTION OF THE DRAWINGS

The invention will now be described with reference to the drawings wherein.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, the bee installation funnel apparatus disclosed herein facilitates, among other things, safe and efficient transfer of bees from a bee cage to a bee hive. Preferably, the bee installation funnel apparatus is articulable from a substantially flat, collapsed configuration of foldable material to a substantially rigid, upright three-dimensional articulated configuration with minimal fabrication effort, while enabling storage and shipment of the bee installation funnel apparatus in a minimum profile orientation while in a collapsed configuration. As will be discussed in greater detail infra, the bee installation funnel apparatus enables the safe and efficient transfer of bees from a bee cage to a bee hive while in the articulated configuration.

Figure 1:
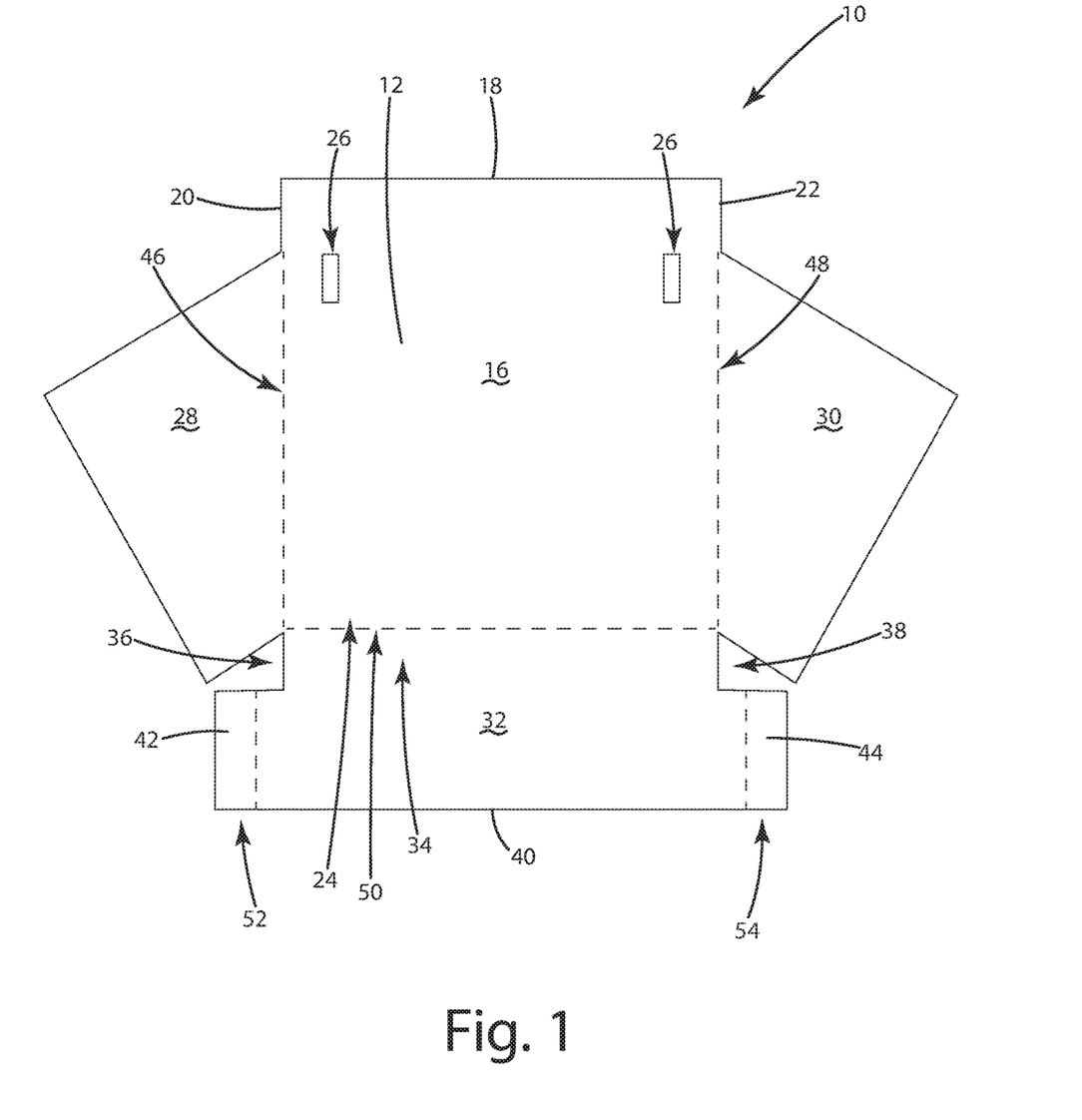
FIG. 1 of the drawings is a plan view of an unarticulated blank of a bee installation funnel apparatus embodying the present invention and showing a back panel, a bottom panel having a plurality of tabs, and side panels in their unarticulated orientation.
Figure 2:
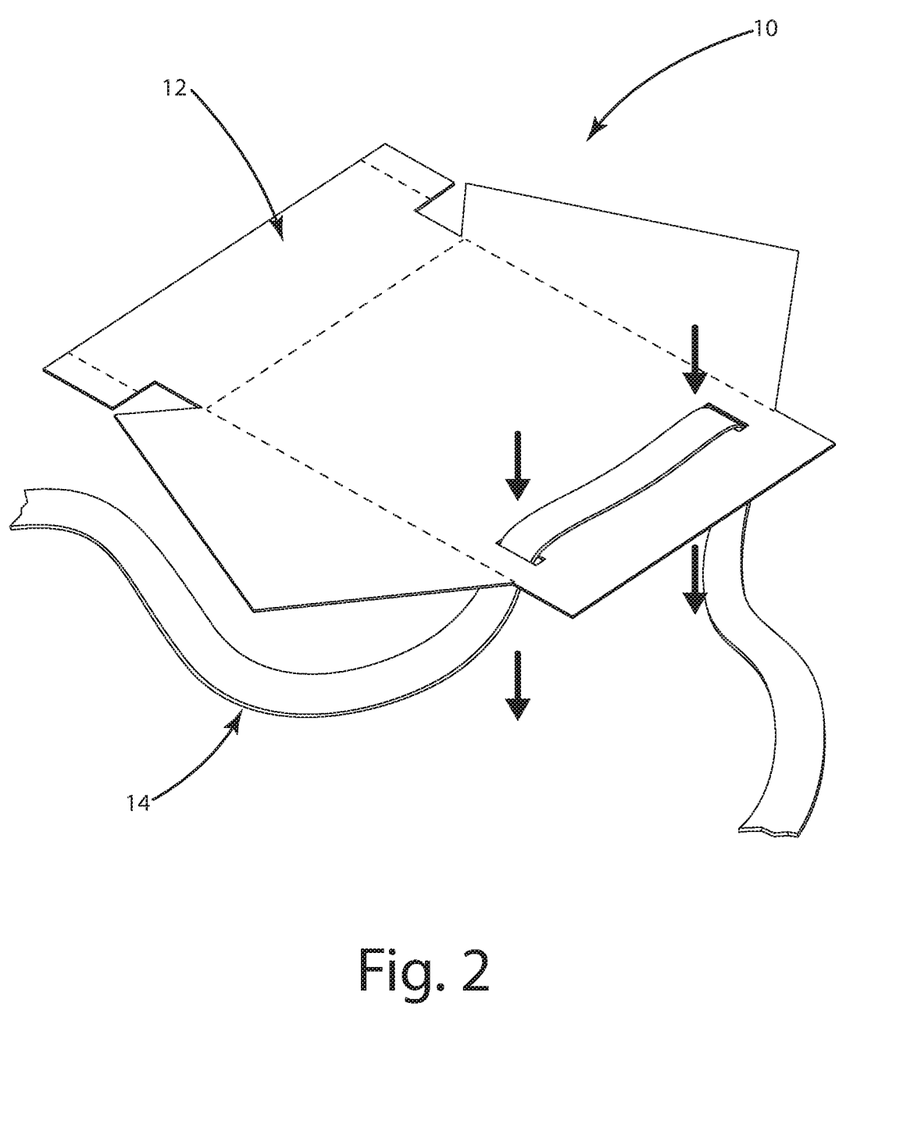
FIG. 2 of the drawings is an isometric view of the bee installation funnel apparatus of FIG. 1 showing a security strap associated therewith.
Figure 3:
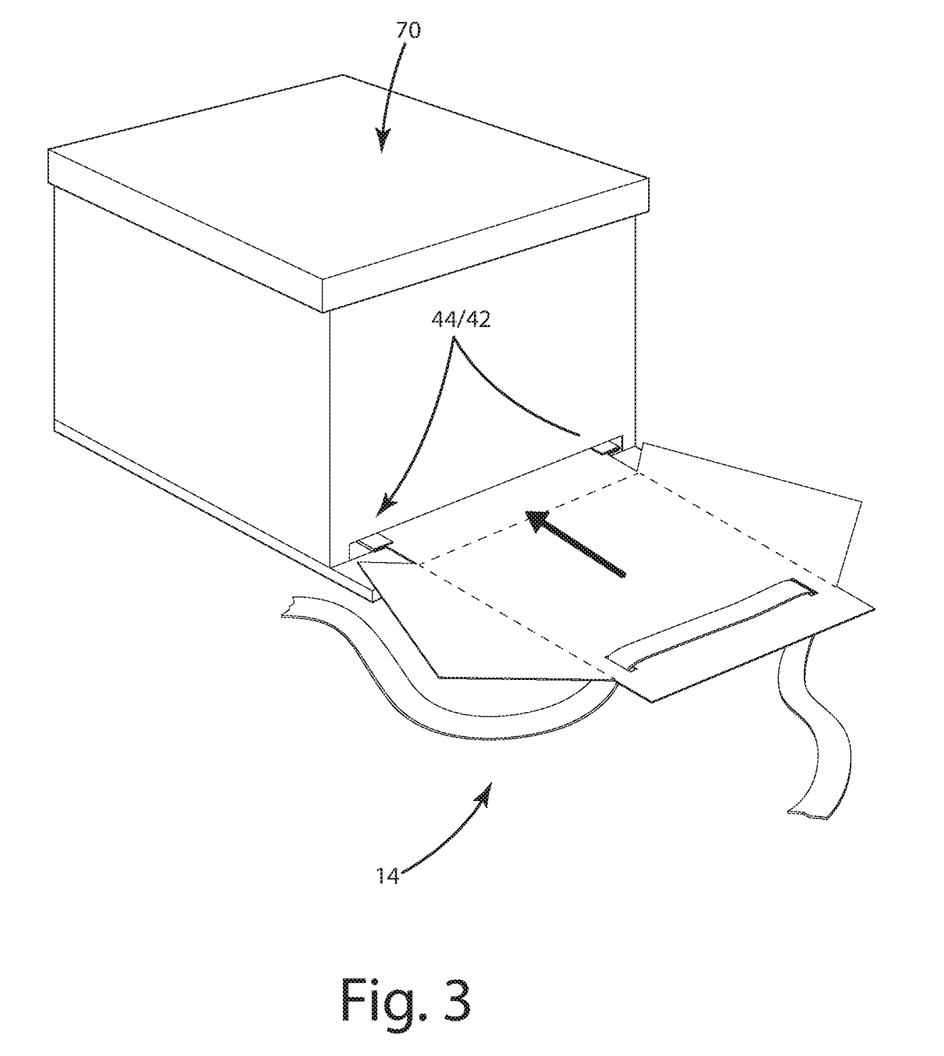
FIG. 3 of the drawings is an isometric view of the bee installation funnel apparatus of FIG. 1 showing articulated tabs of the bottom panel inserted into a front slot of a bee hive.

Referring now to the drawings, and to FIGS. 1 and 2 in particular, bee installation funnel apparatus 10 is shown which generally comprises blank 12 (e.g., unitary blank fabricated from corrugated plastic and/or corrugated paperboard, etcetera) and security strap member 14.

As is best shown in FIG. 1, blank 12 preferably includes back panel 16 having top side 18, left side 20, right side 22, and a bottom side/interface 24. In one embodiment of the present invention, back panel 16 is preferably generally rectangular. Apertures 26 are also provided for accommodating security strap member 14 during operation and use.

As is further shown in FIG. 1, blank 10 also includes left side panel 28 and right side panel 30—both of which preferably emanate contiguously from the left and right sides 20 and 22, respectively of back panel 16.

In addition, blank 10 includes bottom panel 32 having top side/interface 34, left side 36, right side 38, and bottom side 40. Left tab 42 emanates contiguously from left side 36 of bottom panel 32, and right tab 44 emanates contiguously from right side 38 of bottom panel 32.

As is best shown in FIG. 1, score line 46 is positioned between and/or forms an interface with left side 20 of back panel 16 and left side panel 28. Moreover, score line 48 is positioned between and/or forms an interface with right side 22 of back panel 16 and right side panel 30. Furthermore, score line 50 is positioned between and/or forms an interface with bottom side 24 of back panel 16 and top side 34 of bottom panel 32.

Referring once again to FIG. 1, score line 52 is positioned between and/or forms an interface with left side 36 of bottom panel 32 and left tab 42. Score line 54 is positioned between and/or forms an interface with right side 38 of bottom panel 32 and right tab 44.

It will be understood that score lines 46, 48, 50, 52, and 54 enable articulation of blank 10 from a substantially flat, collapsed, and/or storage configuration to a substantially upright, three-dimensional articulated and/or use configuration. It will be further understood that the score lines of the present invention may optionally comprise gusseted folds, indents, depressions, one-way hinges, two-way hinges, living hinges, and/or other means to enable predetermined articulation along the intended interface.

Figure 5:
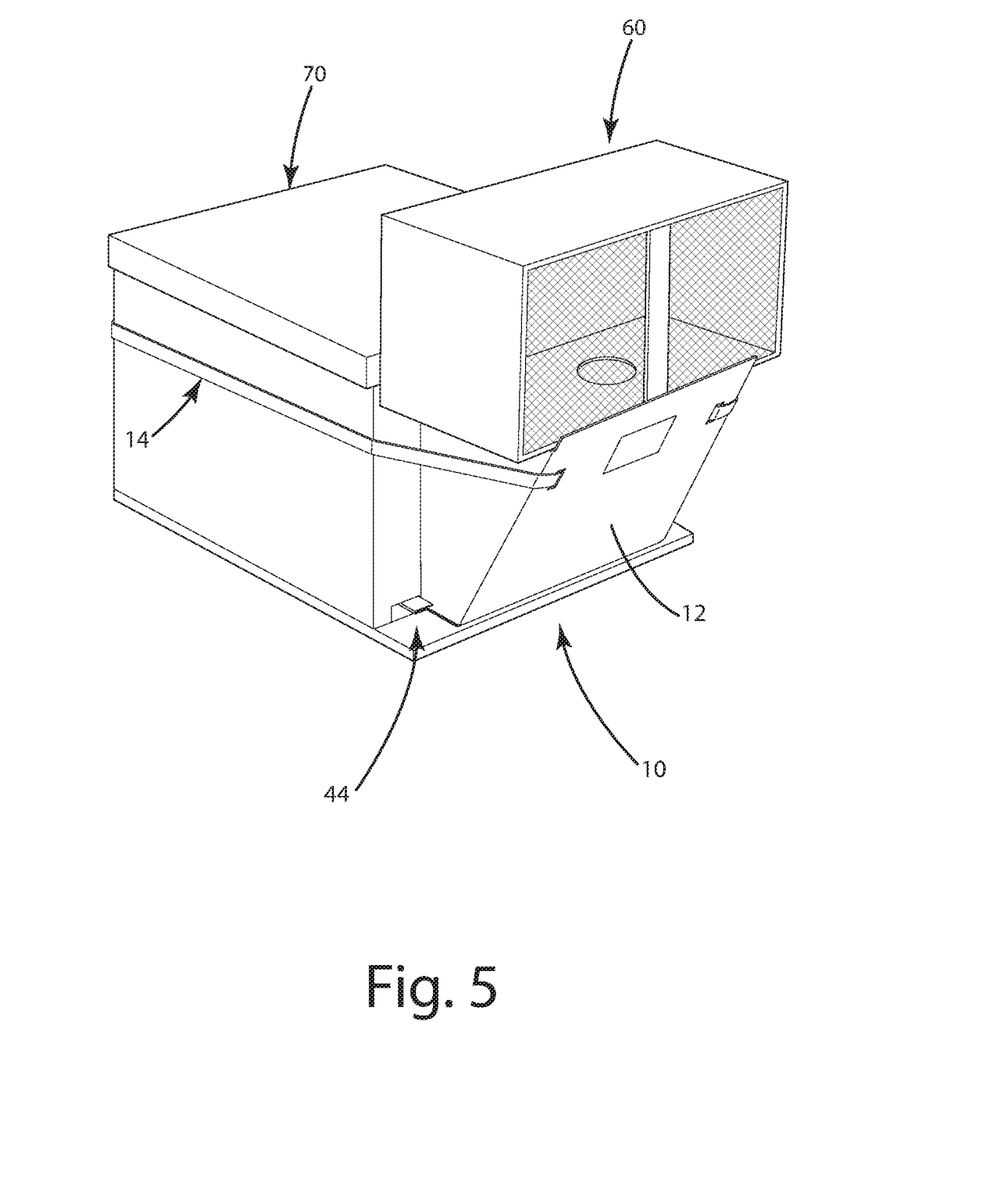
FIG. 5 of the drawings is an isometric view of a bee installation assembly comprising a bee installation funnel apparatus, a bee cage, and a bee hive.

Referring now to FIG. 5, the present invention is also directed to a bee installation assembly comprising bee installation funnel apparatus 10, bee cage 60, and bee hive 70 (e.g., a Langstroth hive).

Bee cage 60 preferably includes a left wall, a right wall, a bottom wall, a top wall, a front wall, and a back wall, wherein these walls are spaced apart from one another to form a chamber for containing bees therein. It will be understood that the term wall includes mesh screens and the like.

Bee hive 70 preferably includes a left wall, a right wall, a bottom wall, a top wall, a front wall, and a back wall, wherein the walls are spaced apart from one another to form a chamber for containing bees therein. The front wall of bee hive 70 preferably further includes an access aperture for the ingress and egress of bees therethrough.

Figure 4:
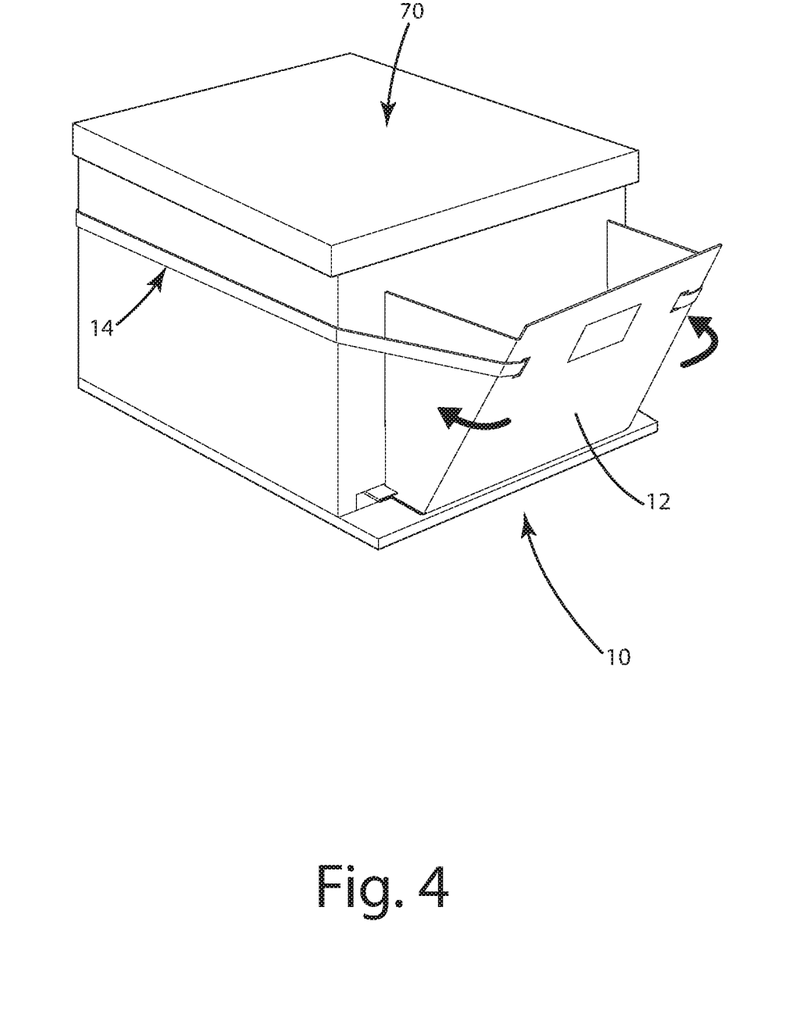
FIG. 4 of the drawings is an isometric view of the bee installation funnel apparatus of FIG. 1 showing articulated tabs of the bottom panel inserted into a front slot of a bee hive and articulated side panels secured to a bee hive with a security strap.

As is shown collectively in FIGS. 1-5, and in operation, security strap member 14 is positioned through apertures 26 of blank 10. Second, tabs 42 and 44 are folded along their respective score lines and inserted into the access aperture of the bee hive, thereby occupying a portion of the aperture while leaving the substantial remainder for the ingress and egress of bees therethrough. Third, side panels 28 and 30, as well as bottom panel 32 are folded along their respective score. Fourth, security strap member 14 is secured around bee hive 70 as is shown in FIG. 4. Lastly, bee cage 60, preferably having a queen bee and a plurality of worker bees is positioned on the articulated blank 10 (i.e., now bee installation funnel apparatus 10). In this configuration, bees are now able to safely and efficiently relocate from bee cage 60 to bee hive 70.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A bee installation funnel apparatus, for transferring bees from a bee cage to a bee hive, said bee installation funnel apparatus being articulable from a substantially flat, collapsed configuration of foldable material to a substantially rigid, upright three-dimensional articulated configuration with minimal fabrication effort, while enabling storage and shipment of said bee installation funnel apparatus in a minimum profile orientation while in said collapsed configuration, and further while enabling safe and efficient transfer of bees from the bee cage to the bee hive while in said articulated configuration, said bee installation funnel apparatus, consisting of:

a unitary blank consisting of:
  a back panel, wherein the back panel consists of a top side, a left side, a right side, and a bottom side, and two apertures, wherein the top side of the back panel is a top of the unitary blank;
  a left side panel, wherein the left side panel emanates contiguously from the back panel;
  a right side panel, wherein the right side panel emanates contiguously from the back panel;
  a bottom panel, wherein the bottom panel is positioned below the back panel and consists of a top side, a left side, a right side, a bottom side, a left tab and a right tab;
  a first score line positioned between the left side panel and the back panel;
  a second score line positioned between the right side panel and the back panel;
  a third score line positioned between the bottom panel and the back panel;
  a fourth score line positioned between the left tab and the left side of the bottom panel;
  a fifth score line positioned between the right tab and the right side of the bottom panel; and
a security strap member, wherein the security strap member is positionable around the bee hive.

* * * * *